United States Patent [19]

Kottke et al.

[11] Patent Number: 4,690,252
[45] Date of Patent: Sep. 1, 1987

[54] ROTATION-PREVENTING LOCKING DEVICE FOR A PORTABLE TOOL

[75] Inventors: Joachim Kottke, Remseck; Gerhard Zerrer, Korb, both of Fed. Rep. of Germany

[73] Assignee: Andreas Stihl, Waiblingen, Fed. Rep. of Germany

[21] Appl. No.: 811,377

[22] Filed: Dec. 20, 1985

[30] Foreign Application Priority Data

Dec. 22, 1984 [DE] Fed. Rep. of Germany ....... 3447154

[51] Int. Cl.[4] .......................... B62C 7/02; F16D 69/00; B23B 29/24; F16M 21/44
[52] U.S. Cl. ..................... 188/69; 74/99 A; 74/107; 74/813 L; 188/265
[58] Field of Search ............. 188/31, 60, 69, 265; 70/184, 185, 226, 228; 192/148, 71; 74/527, 530, 813 L, 99 A, 107; 173/164

[56] References Cited

U.S. PATENT DOCUMENTS

| 2,366,079 | 12/1944 | Wilson | 74/813 L X |
| 3,206,990 | 9/1965 | Uml | 74/107 |
| 3,545,628 | 12/1970 | Dechantsreiter | 74/813 L X |
| 3,899,852 | 8/1975 | Batson | 74/527 X |
| 4,467,896 | 8/1984 | Sauerwein et al. | 188/69 |

Primary Examiner—Andres Kashnikow
Assistant Examiner—Robert J. Oberleitner
Attorney, Agent, or Firm—Walter Ottesen

[57] ABSTRACT

A locking device is disclosed to prevent a rotatably journalled part of a portable tool from rotating. The locking device includes a blocking element which coacts with the rotatably journalled part for blocking the rotation thereof. The blocking element is disposed on the tool and can be shifted from a clear position permitting rotation into a blocking position preventing rotation. In the latter position, the blocking element is braced against the tool. Thus, the blocking element is always present on the tool and is available for use at any time. The blocking element does not need to be held manually in the blocking position because it is supported on the tool.

15 Claims, 20 Drawing Figures

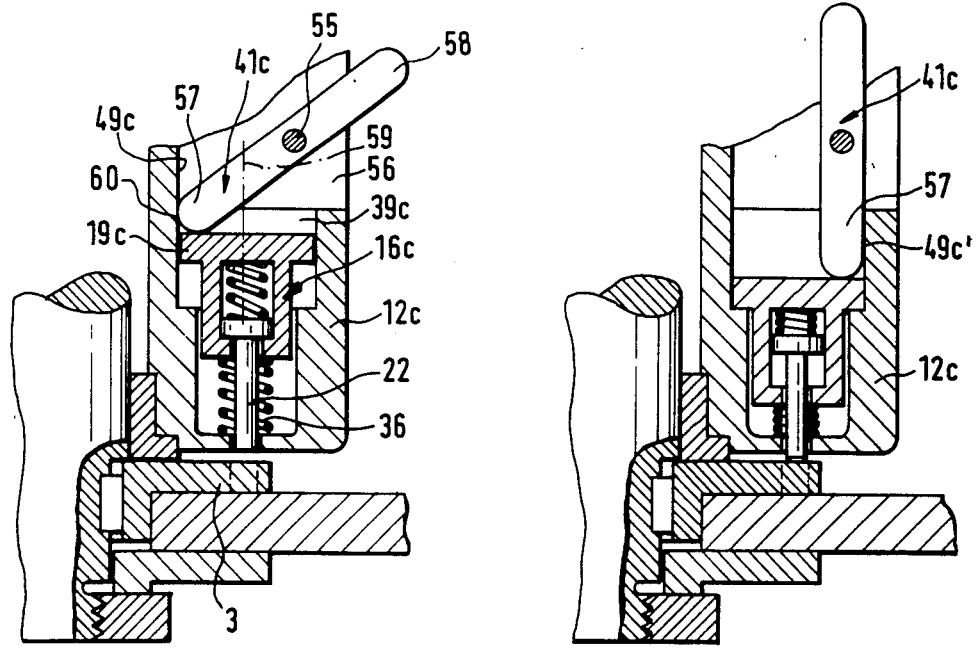
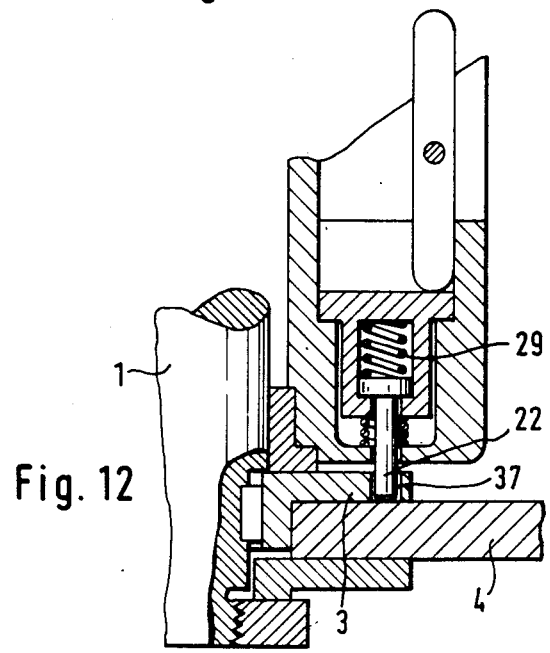
Fig. 10    Fig. 11
Fig. 12

ROTATION-PREVENTING LOCKING DEVICE FOR A PORTABLE TOOL

FIELD OF THE INVENTION

The invention relates to a rotation-preventing locking device for a rotatably supported part of a portable tool such as a brushcutter or the like. The locking device has at least one latching member that cooperates with at least one blocking member.

BACKGROUND OF THE INVENTION

In a free-cutting tool such as a brushcutter, the rotatable cutting tool is mounted interchangeably, in a positive interlocking or force-actuated manner, on a drive shaft between two thrust pieces which are supported on the shaft and are axially secured with a nut. The upper thrust piece abuts against a corresponding stop of the drive shaft. For sharpening or changing tools, for instance, the cutting tool must be removed from the drive shaft. To this end, the nut must be loosened so that the lower thrust piece and the cutting tool can be removed from the shaft. During this operation, the drive shaft must be prevented from rotating. The upper thrust piece is provided with a blocking bore, into which the tool operator inserts a pin which is carried for use as a blocking element. The housing of the free-cutting tool has an insertion opening, through which the operator must insert the pin. The tightened nut must then be turned until such time as the blocking bore in the upper thrust piece is within engagement range of the pin and the pin can be inserted into the blocking bore. Since a rotationally secure connection with the drive shaft is effected via the thrust pieces, the inserted pin secures the drive shaft against rotating, so that the nut can then be loosened easily. Since the tool operator must always carry the pin, it repeatedly happens that the pin is forgotten or lost, so that it is not available for use when needed. In that case, there is considerable difficulty associated with removing the cutting tool from the drive shaft or loosening the nut.

SUMMARY OF THE INVENTION

It is an object of the invention to provide a locking device for preventing rotation such that the rotatable part can be secured against rotating in order that it can be removed without using additional blocking elements that must otherwise be carried about by the operator.

In this kind of rotation-preventing locking device, the above-mentioned object is attained by disposing the blocking element on the portable tool such that it is adjustable from a position enabling rotation into a position blocking rotation. In the blocking position, the blocking element is braced against the structure of the portable tool.

With the locking device according to the invention, the blocking element no longer has to be carried by the tool operator; instead, it is always present on the tool. In this way, the blocking element is always available for use, and the rotatable part can easily be secured against rotation. To do so, the blocking element is adjusted from its position permitting rotation into its blocking position, in which it is braced against the structure of the tool. The blocking element accordingly remains in the blocking position, and does not need to be held continuously, by hand, in this position.

Further features of the invention will become apparent from the ensuing description of preferred embodiments of the invention in conjunction with the claims and the drawings.

BRIEF DESCRIPTION OF THE DRAWING

The invention will now be described with reference to the drawings wherein:

FIGS. 10 to 12 show a fourth embodiment of a rotation-preventing locking device according to the invention;

DESCRIPTION OF THE PREFERRED EMBODIMENTS OF THE INVENTION

Figure 1:
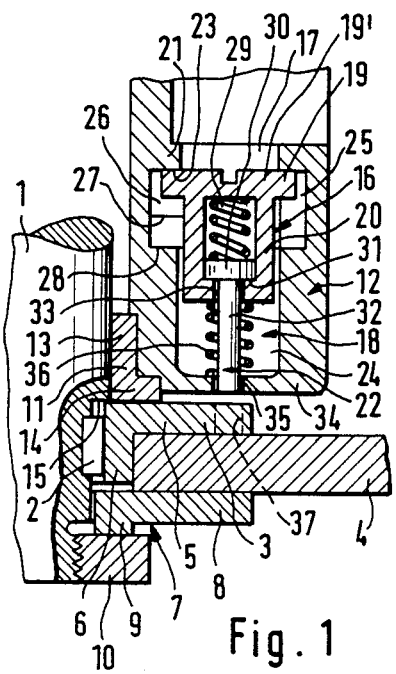
FIG. 1 is a sectional view of a part of a portable tool having a rotation-preventing locking device according to the invention, the blocking element of which is in the position permitting rotation.
Figure 2:
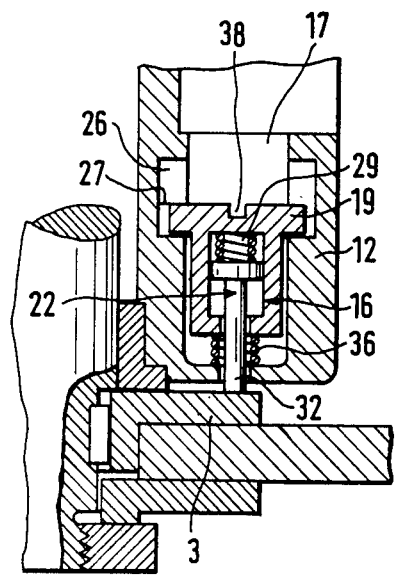
FIG. 2 shows the blocking element in an intermediate position in which it has been moved toward its blocking position.
Figure 3:
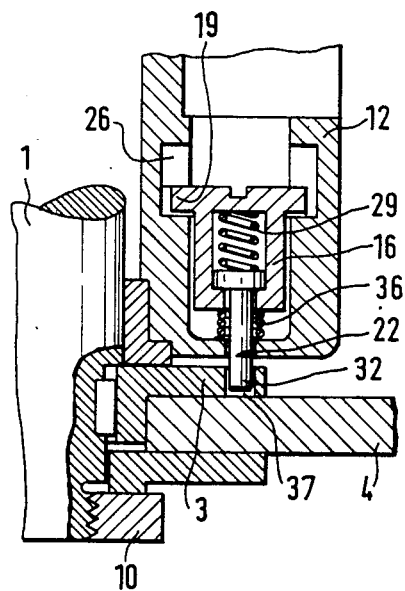
FIG. 3 shows the blocking element in its blocking position.

FIGS. 1 to 3 show a part of a tool which in the case of the embodiment is a hand-held portable brushcutter. It has a drive shaft 1 on which an upper thrust piece 3 is mounted for rotation therewith by means of a fitting key 2. The thrust piece 3 includes a disk-like portion 5 resting against a cutting tool 4, and a cylindrical hub portion 6, which is joined to the drive shaft 1 for rotation therewith by means of the key 2. The cutting tool 4 is located between the upper thrust piece 3 and a lower thrust piece 7, which likewise has a disk-like portion 8 resting against the cutting tool 4. On the lower end of the drive shaft 1, which protrudes beyond the lower thrust piece 7, there is an axial securing member 10, which in this embodiment is a nut that is threadably engaged with the free end of the shaft. The axial securing member 10 rests against the end face of the hub portion 9 of the lower thrust piece 7 and presses it against the cutting tool 4. As FIG. 1 shows, the cutting tool 4 is clamped between the two thrust pieces 3 and 7, which are spaced apart from one another, by means of the axial securing member 10. The upper thrust piece 3 is supported on a bearing bush 11, which is secured on a housing 12 and with a cylindrical hub portion 13 surrounds the drive shaft 1. The bearing bush 11 also has an annular flange 14 extending radially outwardly on which the upper thrust piece 3 rests. In the vicinity of the two thrust pieces 3 and 7, the drive shaft 1 is offset radially inwardly such that a radially located shoulder face 15 is formed, against which the upper thrust piece 3 can be clamped by means of the axial securing member 10.

A sleeve-like actuation element 16 is displaceably supported in the housing 12. The actuation element 16 is accommodated in a chamber 18 that is accessible from the outside via an opening 17; the actuation element 16 has flange-like projections 19, acting as a stop, which protrude radially beyond a sleeve portion 20 of the element 16. The opening 17 is provided in a housing cap 21 which is integral with the housing 12. In the position of a blocking element 22 permitting rotation, as shown in FIG. 1, the actuation element 16 rests with its flange-like projections 19 on the underside 23 of the housing cap 21.

Figure 3A:
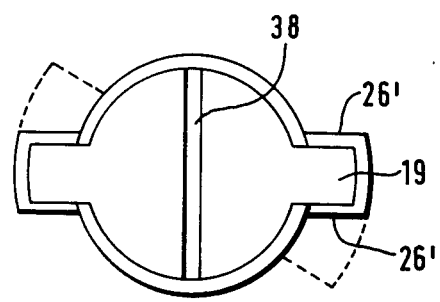
FIG. 3a is a plan view of the actuating member for actuating the blocking element.
Figure 3B:
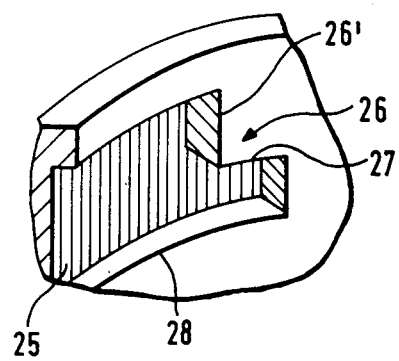
FIG. 3b is a detail view showing a cam formed in the inner wall of the housing for engaging a projection of the top wall of the actuating member of the embodiment of FIGS. 1 to 3.

The sleeve portion 20 is guided with slight radial play in a cylindrical chamber section 24. Between the housing cap 21 and the upper end of the chamber section 24, a recess 25 is provided in the housing wall, the flange-like projections 19 of the actuation element 16 protruding into this recess 25. A cam 26 is formed in the recess 25 and extends downwardly from the housing cap 21 in the direction toward the cutting tool 4. The underside 27 of the cam 26, facing away from the housing cap 21, forms an abutment for the actuation element 16 whenever this element is displaced into the position shown in FIG. 3. The flange-like projections 19 extend outwardly from the periphery of the actuation element 16 and are adapted to coact with the cam 26 formed in the wall of the housing as shown in FIGS. 3a and 3b.

In the position of the actuation element 16 shown in FIG. 1, the flange-like projection 19 engages the recess 25. The cam 26 has side walls 26' located in the direction of displacement of the actuation element 16, and when the actuation element 16 is displaced these side walls 26' serve as axial guides for the actuation element 16 so that it can be reliably displaced into its different positions. In order to be able to displace the actuation element 16 without tilting, preferably a plurality of cams 26 are provided, distributed about the periphery. The distance between the underside 27 of the cams 26 and the opposing, radially extending wall 28 of the annular recess 25 is slightly larger than the thickness of the flange-like projections 19.

A compression spring 29 is accomodated in the sleeve portion 20 of the actuation element 16 and is supported against the top wall 19' and on a head 30 of the blocking element 22. The head 30 is located inside the sleeve portion 20 and, in the position shown in FIG. 1, is supported against the bottom 31 of the actuation element 16 under the force of the compression spring 29. The blocking element 22 has a bolt-like shank 32 adjoining the head 30 and protruding through an opening 33 in the bottom 31. The housing 12 has a bottom 34 having a through opening 35, into which the shank 32 protrudes with its free end, in the initial position shown in FIG. 1. In the area between the housing bottom 34 and the bottom 31 of the actuation element 16, the shank 32 is surrounded by a compression spring 36. This spring 36 is dimensioned to be weaker than the compression spring 29 in the actuation element 16.

The upper thrust piece 3 is provided with at least one blocking bore 37, into which the shank 32 of the blocking element 22 can extend for engagement in the position in which rotation is prevented.

In the position permitting rotation, shown in FIG. 1, the actuation element 16 is subject to the force of the compression spring 36 and rests with its flange-like projections 19 on the underside 23 of the housing cap 21. The compression spring 29 presses the head 30 of the blocking element 22 against the bottom 31 of the actuation element 16. With its sleeve portion 20, the actuation element 16 protrudes into the chamber portion 24. The shank 32 of the blocking element 22 is long enough that the free end of the shank is located inside the through opening 35 in the housing bottom 34, yet does not protrude beyond the housing bottom in the direction of the cutting tool 4. As a result, there is no danger that the blocking part will unintentionally come into contact with the rotating upper thrust piece 3 during operation.

If the cutting tool 4 should need to be sharpened or changed, for instance, then the hexagonal nut 10 must be unscrewed from the drive shaft 1, to enable removal of the lower thrust piece 7 and the cutting tool 4 from the drive shaft. To enable the hexagonal nut 10 to be loosened, the drive shaft 1 and therefore the cutting tool 4 must be secured against rotating. To this end, first the actuation element 16 is pressed downwardly, toward the cutting tool 4, counter to the force of the compression spring 36, using a screwdriver or the like. The screwdriver can easily be inserted into the housing 12 through the opening 17. To enable the screwdriver to engage the actuating element 16 easily, the top wall 19' thereof is provided with a crosswise slit 38 for the screwdriver. Since the cams 26 serve as axial guide means, the actuation element can be displaced downwardly in a reliable manner. As soon as the flange-like projections 19 reach the area below the cams 26, the actuation element 16 is rotated until the flange-like projections 19 leave the vicinity of the cam side walls 26'. The actuation element 16 is then pressed with its flange-like projections 19 against the underside 27 of the cams 26, by the force of the spring 36. The cams serve as an abutment for the actuation element 16, so that the tool operator does not need to keep the actuation element constantly depressed using the screwdriver. As the actuation element 16 is displaced, the blocking element 22 is moved along with it; initially, the blocking element 22 remains in its position shown in FIG. 1, because the force of the compression spring 29 is greater than the force of the compression spring 36. As soon as the shank 32 meets the upper thrust piece 3, however, the blocking element 22 is displaced relative to the actuation element 16, counter to the force of the compression spring 29. As a result, the blocking element 22 rests with its shank 32 with a pre-load on the thrust piece 3. This intermediate position is shown in FIG. 2.

Next, the cutting tool 4 is rotated by hand until the blocking bore 37 of the thrust piece 3 reaches the vicinity of the blocking element 22. Because of the pre-stressed compression spring 29, the blocking element 22 is then pressed with its shank 32 into the blocking bore 37 (FIG. 3). As a result, the cutting tool 4 along with the drive shaft 1 is secured against rotating. The hexagonal nut 10 can then be easily unscrewed from the drive shaft 1, so that the cutting tool 4 can be removed from the drive shaft. In the blocking position shown in FIG. 3, the blocking element 22 is supported via the compression spring 29 and the actuation element 16 on the cam 26 of the housing 12, so that the blocking element 22 is reliably held in its blocking position.

If the blocking position is no longer necessary, then the actuation element 16 is rotated with a screwdriver such that the flange-like projections 19 are aligned with the vertical side walls 26' of cams 26. Under the force of the compression spring 36, the actuation element 16 is then automatically displaced upwardly into the position permitting rotation (FIG. 1), until the flange-like projections rest on the underside 23 of the housing cap 21.

In this embodiment, the actuation element 16, the blocking element 22 and the compression springs 29, 36 are accommodated in a protected manner in the housing 12, so that dirt particles and the like cannot get into the area of the rotation-preventing locking device while the brushcutter is in operation. This assures that the rotation-preventing locking device will always function reliably.

Figures 4, 5:
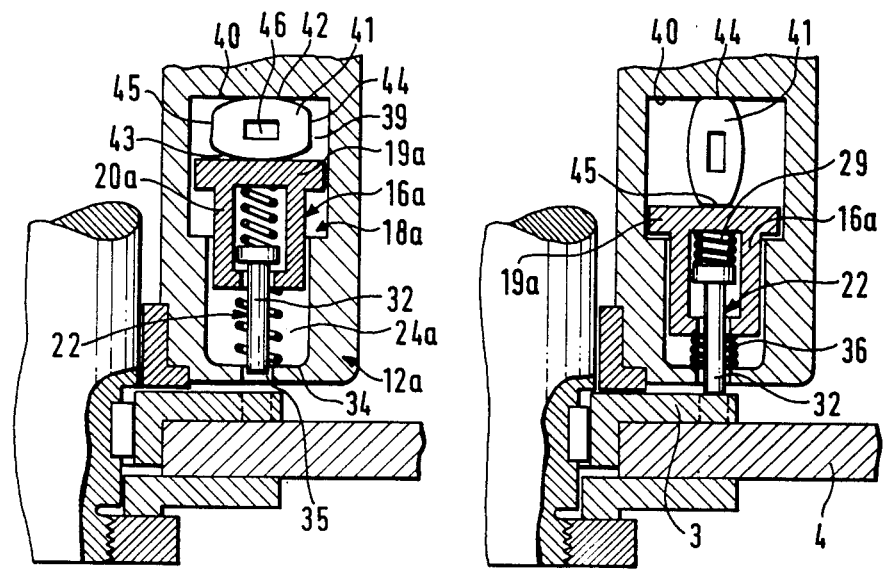
FIGS. 4 to 6 show a second embodiment of a rotation-preventing locking device according to the invention, in views corresponding to those of FIGS. 1 to 3.
Figure 6:
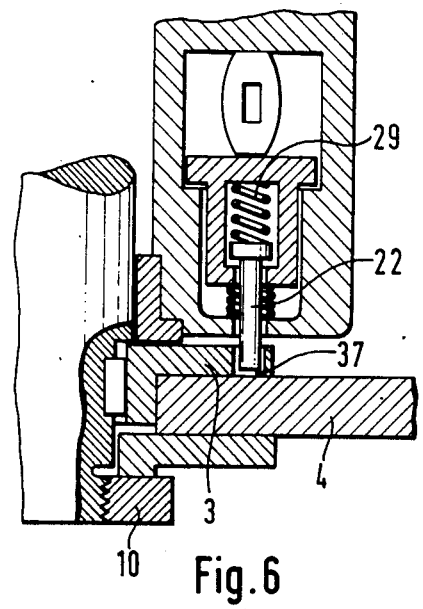

In the embodiment shown in FIGS. 4 to 6, the flange 19a of the actuation element 16a is closed. The flange 19a is displaceable in a chamber portion 39 of the chamber 18a. Chamber portion 39 has a diameter greater than the diameter of chamber section 24a into which the sleeve portion 20 of the actuation element 16a penetrates. The chamber section 39 has a constant diameter over its entire elevation and it is closed at the top by a housing wall 40. An adjusting element 41 for the actuation element 16a is located between the flange 19a of the actuation element 16a and the housing wall 40. The positioning element 41 is mounted on a shaft so that it can be rotated out of the position shown in FIG. 4 into the position shown in FIGS. 5 and 6. The positioning element 41 has an approximately rectangular cross section, with convex curved long sides 42 and 43, which are longer than the straight short sides 44 and 45. In its end face, the adjusting element 41 is provided with a rectangular tool access hole 46, into which an appropriate wrench can be inserted. The chamber section 39 is accessible from outside through an opening (not shown) in the housing 12a. Otherwise, this rotation-preventing locking device is configured identically to that shown in FIGS. 1 to 3a.

In the position enabling rotation (FIG. 4), the adjusting element 41 rests with its convex curved long sides 42 and 43 on the housing wall 40 and on the flange 19a of the actuation element 16a, respectively. The shank 32 of the blocking element 22 is disposed with its free end in the through opening 35 of the housing bottom 34. If the adjusting element 41 is rotated by 90° (see FIG. 5), the actuation element 16a is displaced toward the cutting tool 4, counter to the force of the compression spring 36. As soon as the blocking element 22 comes to rest with its shank 32 on the upper thrust piece 3, then upon the displacement of the actuation element 16a, the blocking element 22 is displaced relative to the actuation element, counter to the force of the compression spring 29. Since the positioning element 41, in the initial position, rests with its convex curved long sides 42, 43 on the housing wall 40 and on the flange 19a, respectively, it can be easily rotated out of this horizontal position into the vertical position. The transitions between the long sides and the short sides are curved as well, so that the positioning element 41 can be rotated easily into its vertical position (FIGS. 5 and 6). In this position, the straight short sides 44 and 45 rest on the housing wall 40 and on the flange 19a, respectively.

Since the short sides are straight, the positioning element 41 is satisfactorily well supported in this vertical position, so there is no danger that it could be unintentionally rotated back into its horizontal position under the force of the compression springs 29, 36. Then, the cutting tool 4 is again rotated until the blocking bore 37 of the thrust piece 3 reaches the vicinity of the blocking element 22, so that the blocking element 22 can engage the blocking bore 37 under the force of the compression spring 29 (FIG. 6). In this position, the blocking element 22 is supported via the compression spring 29, the actuation element 16a and the adjusting element 41 on the housing wall 40 which serves as an abutment. Because of the support of the positioning element 41 via the straight short sides 44, 45, the positioning element does not need to be held in its vertical position by means of the wrench while the hexagonal nut 10 is loosened and the cutting tool 4 is removed. Thus, the hexagonal nut can simply be loosened and then screwed back on again after removal or replacement of the cutting tool.

If the blocking element is to be returned to its position enabling rotation (FIG. 4), all that needs to be done is to rotate the positioning element 41 out of its vertical position into its horizontal position. The actuation element 16a and the blocking element 22 are then automatically displaced, by the force of the compression springs 29, 36, into the position permitting rotation as shown in FIG. 4. In this embodiment, the positioning element 41 must merely be rotated through 90° in order to displace the blocking element 22 out of its position enabling rotation and into its position blocking rotation, and vice versa. It is accordingly very simple and unproblematic to manipulate this rotation-preventing locking device.

Figure 7:
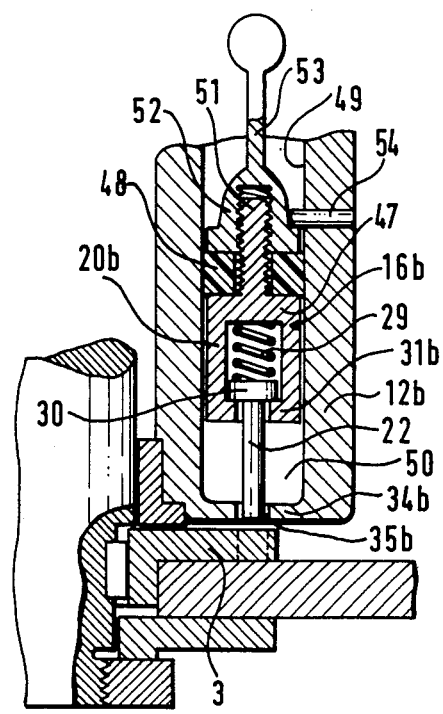
FIGS. 7 to 9 show a third embodiment of a rotation-preventing locking device according to the invention, in views corresponding to those of FIGS. 1 to 3.
Figure 8:
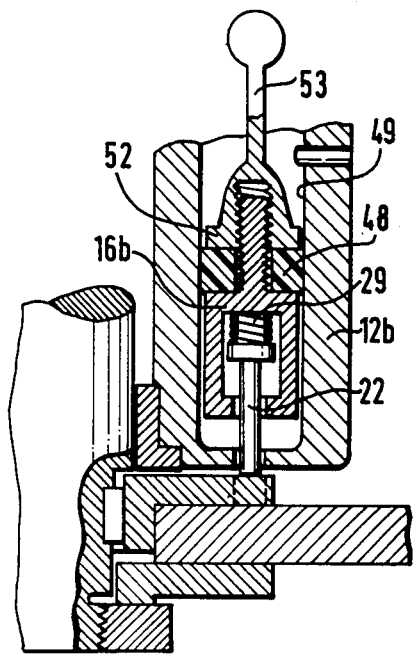
Figure 9:
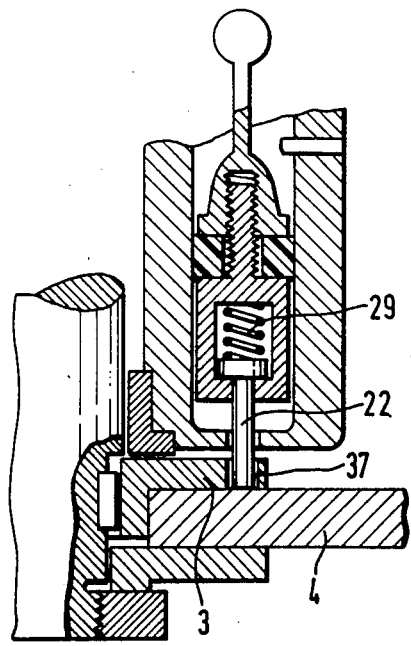

In the embodiment shown in FIGS. 7 to 9, the actuation element 16b is held on the housing 12b by frictional engagement. The actuation element 16b has, instead of the flange, a closure cap 47, on which the compression spring 29 is supported. The closure cap 47 is integral with the sleeve portion 20b of the actuation element and has the same outer diameter as the sleeve portion. At least one friction element 48 is secured on the closure cap 47 and is in frictional contact engagement with the inner wall 49 of a cylindrical chamber 50 of the housing 12b. The chamber 50 is closed at the bottom by the housing base 34b.

In this embodiment, the friction element 48 is annular. Instead of this single friction element 48, however, a plurality of friction elements can be provided and distributed about the periphery of the closure cap 47. On the side facing away from the compression spring 29, a threaded stub 51 projects upwardly from the closure cap 47, and a clamping element 52 threadably engages the threaded stub 51. The clamping element 52 rests entirely on the friction element 48 and is provided with a handle 53, with which it can be rotated on the threaded stub 51. The actuation element 16b can also be displaced in the axial direction by means of the handle 53. The displacement path of the clamping element 52 and hence of the actuation element 16b is defined by a stop 54, which is a bolt that protrudes beyond the inner wall 49 of the chamber 50 and is hammered into the housing wall from outside. Any other suitably stop may be used, however, instead of this bolt-like stop 54.

With the clamping element 52, the friction element 48 can be compressed axially, by screwing the clamping body in the direction toward the actuation element 16b, using the handle 53. In this process, the friction element 48 is elastically compressed, which increases the pressure exerted on the inner wall 49 of the chamber 50. In this manner, the frictional force of this rotation-preventing locking device is easily adjusted in accordance with the force of the compression spring 29. Otherwise, this rotation-preventing locking device is again configured identically to the embodiment shown in FIGS. 1 to 3a.

In the position permitting rotation, shown in FIG. 7, the clamping element 52 rests on the stop 54. The head 30 of the blocking element 22 is pressed by the compression spring 29 against the bottom 31b of the actuation element 16b. The free end of the blocking element 22 is located inside the through opening 35b in the housing bottom 34b. With the handle 53, the actuation element 16b can be displaced downwardly, overcoming the frictional engagement between the friction element 48 and the inner wall 49. As soon as the blocking element 22 meets the upper thrust piece 3, then upon further displacement of the actuation element 16b, the blocking element 22 is displaced relative to the actuation element and counter to the force of the compression spring 29 (FIG. 8).

Because of the constantly operative frictional engagement between the friction body 48 and the inner wall 49 of the housing 12b, the actuation element 16b remains in its depressed position as soon as the handle 53 is released. The force of the compressed compression spring 29 is not sufficient to overcome the frictional engagement. If upon displacing the actuation element 16b, the tool operator should notice that the frictional engagement is not sufficiently strong, then he needs merely to compress the friction element 48 still further, with the clamping body 52, in order to increase the frictional engagement. Then the cutting tool 4 again needs merely to be rotated far enough that the blocking element 22 under the force of the compression spring 29, automatically locks into place in the blocking bore 37 of the thrust piece 3. In this blocking position, the blocking element 22 is supported on the housing 12b via the compression spring 29, the actuation element 16b and the friction element 48. So that the actuation element 16b can be displaced easily in the chamber 50, the diameter of the sleeve portion 20b of the actuation element and of the clamping body 52 is slightly less than the diameter of the receiving chamber 50.

If the blocking position is no longer required, the actuation element 16b is again merely displaced backwardly, using the handle 53, unitl the clamping element 52 strikes the stop 54. As in the foregoing embodiments, the compression spring 29 relaxes enough that the head 30 of the blocking element 22 again rests on the bottom 31b of the actuation element 16b which then moves the blocking element 22 into the position enabling rotation as shown in FIG. 7. The handle 53 is easily accessible from outside, so that the tool operator can actuate the rotation-preventing lock without difficulty.

The embodiments of FIGS. 10 to 12 substantially corresponds to that shown in FIGS. 4 to 6. Here, a two-armed lever is provided as the positioning element 41c, which is pivotally supported on pivot pin 55. The housing 12c is provided with an opening 56 for the positioning element 41c. In the position of the blocking element 22 shown in FIG. 10, in which it permits rotation, the positioning element 41c rests with one arm 57 on the flange 19c of the actuation element 16c, while the other arm 58 of the positioning element protrudes out of the housing 12c through the opening 56. At the same time, the positioning element 41c acts as a stop for the actuation element 16c, by means of which the position of the actuation element 16c in the rotation-permitting position of the blocking element 22 is determined. The pivot pin 55 of the adjusting element 41c is offset with respect to the longitudinal axis 59 of the actuating element 16c. The free end of the arm 57 rests near the outer rim on the edge 19c of the actuation element 16c and on the inner wall 49c of the chamber portion 39c. As FIG. 10 shows, the arm 57 here is at an angle of 45° with respect to the axis 59 of the actuation element 16c. It is for this reason that the positioning element 41c can support the actuation element 16c counter to the force of the compression spring 36.

In order to shift the blocking element 22 into its position preventing rotation, the positioning element 41c, with its arm 58, is pivoted counterclockwise about the pivot pin 55. Since the end face 60 of the arm 57 is rounded off to define a portion of a circle, the positioning element 41c can be pivoted effortlessly, and the actuation element 16c is displaced downwardly counter to the force of the compression spring 36. As in the foregoing embodiments, the blocking element 22 comes to rest during this process on the thrust piece 3, which prevents it from being displaced further. The actuation element 16c is then displaced relative to the blocking element 22 into the position shown in FIG. 11. The positioning element 41c can be pivoted far enough that its arm 57 comes to rest on the inner wall 49c' of the housing 12c facing the inner wall 49c (see FIG. 11). The positioning element 41c is suitably pivotable beyond the top dead center position which prevents the blocking element from being unintentionally pivoted back into its initial position shown in FIG. 10. Then, once again all that needs to be done is to rotate the cutting tool 4 until the blocking bore 37 of the thrust piece 3 comes into the vicinity of the blocking element 22, which then automatically locks into place in the blocking bore under the force of the compression spring 29. The cutting tool 4 and the drive shaft 1 are then prevented from rotating by this rotation-preventing locking device. The blocking element is supported on the housing 12c via the compression spring 29, the actuation element 16c, the adjusting element 41c and the pin 55.

In order to return the blocking element 22 to its position permitting rotation (FIG. 10), the positioning element 41c is merely pivoted clockwise by means of the arm 58 with the actuation element 16c and the blocking element 22 being displaced upwardly by the force of the compression springs 29 and 36, and with this upward displacement reinforcing the pivoting of the positioning element 41c. As soon as the arm 57 meets the inner wall 49c of the housing 12c, further displacement of the actuation element 16c is no longer possible. This embodiment is distinguished by a very simple structure, in which the positioning element 41c not only serves to displace the actuation element 16c and the blocking element 22, but also acts to stop to secure the actuation element against axial displacement in the position permitting rotation.

Figure 13:
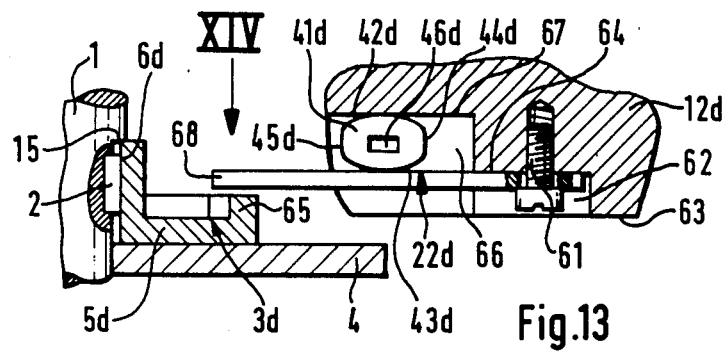
FIG. 13 is a sectional view of a part of a tool equipped with a fifth embodiment of the rotation-preventing locking device according to the invention, the blocking element of which is in the position permitting rotation.
Figure 14:
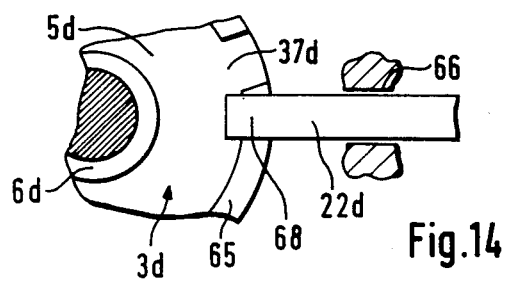
FIG. 14 is a view taken in the direction of the arrow XIV of FIG. 13.
Figure 17:
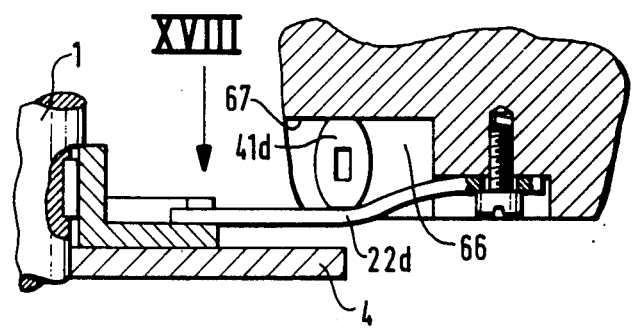
FIG. 17 shows the blocking element of the locking device of FIG. 13 in its blocking position; and, FIG. 18 is a view taken in the direction of the arrow XVIII in FIG. 17.
Figure 18:
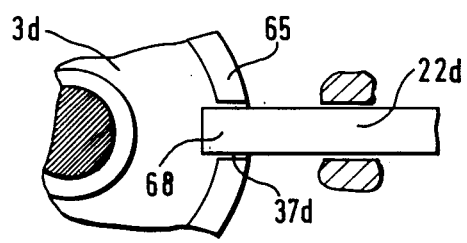

In the embodiment shown in FIGS. 13 to 18, an elastically deformable component is used as the blocking element 22d; in the embodiment shown, this blocking element is a leaf spring secured at one end with a screw 61 in a recess 62 on the underside 63 of the housing 12d. The screw 61 is countersunk in the recess 62. In the vicinity of the screw 61, the blocking element 22b, embodied as an elongated rectangular leaf spring, rests on the bottom 64 of the recess 62. The blocking element 22d extends to above the thrust piece 3d, the cylindrical hub portion 6d of which points upwardly and is joined in a rotationally secure manner to the drive shaft 1 by means of the key 2. The hub portion 6d is supported on the shoulder face 15 of the drive shaft 1, the shoulder face 15 being directed radially inwardly. On the radially outer rim of the disk-like part 5d resting on the cutting tool 4, the thrust piece 3d is provided with an upwardly directed continuous rim 65, which has an elevation less than the hub portion 6d that extends coaxially with the latter. As FIG. 14 shows, a recess 37d is provided in the rim 65, and with its free end, the blocking element 22d engages this recess 37d in the blocking position (FIGS. 17 and 18).

In the direction toward the drive shaft 1, the recess 62 adjoins a further recess 66, which is greater in depth than the recess 62. The positioning element 41d, which is configured identically to the positioning element 41 of FIGS. 4 to 6, is accommodated in this recess 66. In the position of the blocking element 22d permitting rotation, which is shown in FIGS. 13 and 14, the positioning element 41d is horizontal, so that its convex long sides 42d, 43d rest on the bottom 67 of the recess 66 and on the blocking element 22d, respectively. The free end 68 of the blocking element 22d is located spaced slightly apart from and above the rim 65 of the thrust body 3d. The cutting tool 4, as in the foregoing embodiments, is located between two thrust pieces, of which for the sake of simplicity only the upper thrust piece 3d is shown in FIGS. 13 to 18.

To assure reliable guidance of the narrow, thin blocking element 22d, the recess 66 is only slightly wider than the blocking element 22d (see FIG. 14). In the position permitting rotation (FIG. 13), the blocking element 22d extends through the recess 66 and is located spaced away from the underside 63 of the housing 12d, which reliably prevents the blocking element, in its position enabling rotation, from coming unintentionally into contact with the thrust piece 3d while the cutting tool 4 is rotating.

Figure 15:
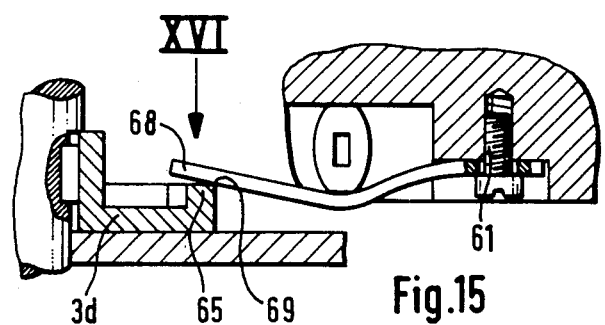
FIG. 15 shows the blocking element of the locking device according to FIG. 13 in an intermediate position in which it has been moved toward its blocking position.
Figure 16:
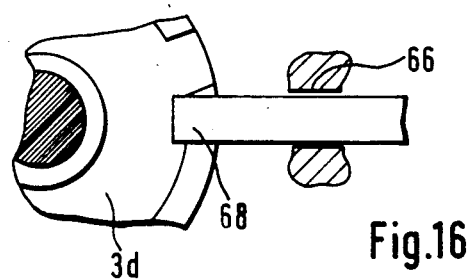
FIG. 16 is a view taken in the direction of the arrow XVI of FIG. 15.

For shifting the blocking element 22d into the blocking position, the positioning element 41d is rotated by 90° into the vertical position shown in FIGS. 15 and 17 by means of a wrench, which is inserted through an opening (not shown) into the recess 66 of the housing 12d and into the tool-access hole 46d of the positioning element. Since the long sides 42d, 43d are spaced apart from one another by a shorter distance than the distance spacing the short sides 44d, 45d of the positioning element 41d apart, the blocking element 22d is elastically bent, as shown in FIG. 15, when the positioning element is rotated. The blocking element 22d is first bent downwardly until its free end 68 rests on the outer edge 69 of the rim 65 of the thrust piece 3d. Upon further rotation of the positioning element 41d, the blocking element 22d is then bent elastically in the vicinity between the screw 61 and the portion resting on the edge 69 (see FIG. 15). Then all that needs to be done is to rotate the cutting tool 4 such that the recess 37d in the rim 65 of the thrust piece 3d reaches the vicinity of the free end 68 of the blocking element 22d. The free end 68 then resiliently enters the recess 37d (FIGS. 17 and 18). The cutting tool 4 and the drive shaft 1 are thereby secured against rotating. The blocking element 22d is supported here on the bottom 67 of the recess 66 via the positioning element 41d.

If the blocking element 22d is moved back into its position permitting rotation as shown in FIGS. 13 and 14, the positioning element 41d is again rotated by 90°.

The blocking element 22d can then spring back resiliently into its initial position shown in FIG. 13 whereat it is located in the region outside the recess 37d and above the thrust piece 3d.

In the embodiments described, if the blocking bore 37 or 37d should by chance be located in the vicinity of the blocking element 22, 22d, then the blocking element immediately enters the blocking bore, so that the cutting tool 4 does not have to be rotated beforehand. In each of the embodiments described, it is assured that the blocking element is held in its blocking position without the operator of the tool having to hold the blocking element continuously in the blocking position by hand. As a result, the hexagonal nut 10 can be loosened and screwed back on again without difficulty.

It is understood that the foregoing description is that of the preferred embodiments of the invention and that various changes and modifications may be made thereto without departing from the spirit and scope of the invention as defined in the appended claims.

What is claimed is:

1. A rotation-preventing locking device for releasably locking a rotatably journalled output drive member of a hand-held portable tool such as a brushcutter or the like, the portable tool having a structure which is stationary relative to the rotatably journalled output drive member, the locking device comprising:

a blocking piece mounted on said structure so as to be movable between a blocking position whereat said blocking piece engages said output drive member for blocking the latter against rotation and a clear position whereat said blocking piece is disengaged from said member so as to permit the latter to rotate freely;

said blocking piece being a blocking pin defining a longitudinal axis and having respective end faces on corresponding longitudinal ends thereof, said blocking pin being mounted on said structure so as to be displaceable between said positions along said axis;

blocking bore means formed in said member for receiving said blocking pin in said blocking position thereof;

releasable latching means disposed on said structure for latching and holding said blocking pin in said blocking position, said latching means including:

a housing on said structure;

an actuating member movably mounted in said housing between an unlatched position and a latched position for actuating said blocking pin between said clear position and said blocking position; and, resilient means interposed between said blocking pin and said actuating member for resiliently biasing said pin toward said blocking position;

said actuating member being a cylinder-like member having a top wall at one end thereof and being movably mounted in said housing vis-a-vis said blocking pin so as to telescopically receive the latter therein, said resilient means being interposed between said top wall and one of said end faces of said blocking pin; and, guide means for guiding said actuating member in said housing between said unlatched and latched positions; and, engaging means formed on said housing and on said actuating member for engaging said actuating member to hold the same in said latched position.

2. The rotation-preventing device of claim 1, said engaging means being a slot formed in the inner wall of said housing; and, said actuation member defining a longitudinal axis coincident with said longitudinal axis of said blocking pin, said actuating member being rotatable about said longitudinal axis thereof and relative to said guide means when the same is in said latched position for engaging said slot and latching said actuating member for holding said blocking pin in said blocking position.

3. The rotation-preventing device of claim 2, comprising second resilient means disposed in said housing for resiliently biasing said actuating member toward said unlatched position.

4. The rotation-preventing device of claim 3, said housing having a bottom wall, said second resilient means being a second spring disposed in surrounding relationship to said blocking pin, said second spring being disposed in said housing between said actuating member and bottom wall of said housing.

5. The rotation-preventing device of claim 4, said first-mentioned resilient means being a first spring dimensioned so as to develop a greater force than said second spring.

6. A rotation-preventing locking device for releasably locking a rotatably journalled output drive member of a hand-held portable tool such as a brushcutter or the like, the portable tool having a structure which is stationary relative to the rotatably journalled output drive member, the locking device comprising:

a blocking piece mounted on said structure so as to be movable between a blocking position whereat said blocking piece engages said output drive member for blocking the latter against rotation and a clear position whereat said blocking piece is disengaged from said member so as to permit the latter to rotate freely;

said blocking piece being a blocking pin defining a longitudinal axis and having respective end faces on corresponding longitudinal ends thereof, said blocking pin being mounted on said structure so as to be displaceable between said positions along said axis;

blocking bore means formed in said member for receiving said blocking pin in said blocking position thereof;

releasable latching means disposed on said structure for latching and holding said blocking pin in said blocking position, said latching means including:

a housing on said structure;

an actuating member movably mounted in said housing between an unlatched position and a latched position for actuating said blocking pin between said clear position and said blocking position; and, resilient means interposed between said blocking pin and said actuating member for resiliently biasing said pin toward said blocking position;

said actuating member being a cylinder-like member having a top wall at one end thereof and being movably mounted in said housing vis-a-vis said blocking pin so as to telescopically receive the latter therein, said resilient means being interposed between said top wall and one of said end faces of said blocking pin;

said blocking pin having a flanged head formed thereon for defining said one end face;

said actuating member having a bottom wall with an aperture formed therein for guiding said blocking pin;

said resilient means being dimensioned to resiliently hold said blocking pin so as to cause said flanged head thereof to bear against said bottom wall when said actuating member is in said unlatched position and for biasing said blocking pin into said blocking bore means when said actuating member is in said latched position;

guide means for guiding said actuating member in said housing between said unlatched and latched positions; and, engaging means formed on said housing and on said actuating member for engaging said actuating member to hold the same in said latched position.

7. A rotation-preventing locking device for releasably locking a rotatably journalled output drive member of a hand-held portable tool such as a brushcutter or the like, the portable tool having a structure which is stationary relative to the rotatably journalled output drive member, the locking device comprising:

a blocking piece mounted on said structure so as to be movable between a blocking position whereat said blocking piece engages said output drive member for blocking the latter against rotation and a clear position whereat said blocking piece is disengaged from said member so as to permit the latter to rotate freely;

said blocking piece being a blocking pin defining a longitudinal axis and having respective end faces on corresponding longitudinal ends thereof, said blocking pin being mounted on said structure so as to be displaceable between said positions along said axis;

blocking bore means formed in said member for receiving said blocking pin in said blocking position thereof;

releasable holding means disposed on said structure for holding said blocking pin in said blocking position, said holding means including:

a housing on said structure;

an actuating member movably mounted in said housing between an unlocked position and a locked position for actuating said blocking pin between said clear position and said blocking position; and, resilient means interposed between said blocking pin and said actuating member for resiliently biasing said pin toward said blocking position;

said actuating member being a cylinder-like member having a top wall at one end thereof and being movably mounted in said housing vis-a-vis said blocking pin so as to telescopically receive the latter therein, said resilient means being interposed between said top wall and one of said end faces of said blocking pin;

said housing having a top wall; and, a positioning member for displacing said actuating member from said unlocked position to said locked position, said positioning member being disposed between said actuating member and said top wall, said positioning member having a cam-like contour and defining a longitudinal axis and being mounted in said housing for rotation about the longitudinal axis thereof for displacing said actuating member from said unlocked position to said locked position.

8. The rotation-preventing device of claim 7, said cam-like contour being approximately rectangular.

9. The rotation-preventing device of claim 7, said positioning member having an approximately rectangular cross section, the long sides of said rectangular cross section having a convex curvature, the short sides of said cross section being spaced apart a distance greater than said long sides.

10. A rotation-preventing locking device for releasably locking a rotatably journalled output drive member of a hand-held portable tool such as a brushcutter or the like, the portable tool having a structure which is stationary relative to the rotatably journalled output drive member, the locking device comprising:

a blocking piece mounted on said structure so as to be movable between a blocking position whereat said blocking piece engages said output drive member for blocking the latter against rotation and a clear position whereat said blocking piece is disengaged from said member so as to permit the latter to rotate freely;

said blocking piece being a blocking pin defining a longitudinal axis and having respective end faces on corresponding longitudinal ends thereof, said blocking pin being mounted on said structure so as to be displaceable between said positions along said axis;

blocking bore means formed in said member for receiving said blocking pin in said blocking position thereof;

releasable holding means disposed on said structure for holding said blocking pin in said blocking position, said holding means including:

a housing on said structure;

an actuating member movably mounted in said housing between an unlocked position and a locked position for actuating said blocking pin between said clear position and said blocking position; and, first resilient means interposed between said blocking pin and said actuating member for resiliently biasing said pin toward said blocking position;

said actuating member being a cylinder-like member having a top wall at one end thereof and being movably mounted in said housing vis-a-vis said blocking pin so as to telescopically receive the latter therein, said resilient means being interposed between said top wall and one of said end faces of said blocking pin;

a positioning member for displacing said actuating member from said unlocked position to said locked position, said positioning member being a two-arm level pivotally mounted on said housing, one of the arms being in contact engagement with said actuating member for displacing the latter from said unlocked position to said locked position in response to a manual actuation of the other arm of said lever.

11. The rotation-preventing device of claim 10, said lever being pivotally mounted on said housing so as to cause said one arm to be in abutting contact engagement with a portion of the inner wall surface of said housing when said actuating member is in said unlocked position.

12. The rotation-preventing device of claim 11, said lever being pivotally mounted on said housing so as to cause said one arm to be in abutting contact engagement with a further portion of said inner wall surface of said housing adjacent said first-mentioned portion of the inner wall surface thereby holding said actuating member in said locked position.

13. A rotation-preventing locking device for releasably locking a rotatably journalled output drive member of a hand-held portable tool such as a brushcutter or the like, the portable tool having a structure which is stationary relative to the rotatably journalled output drive member, the locking device comprising:

a housing on said structure;

a blocking piece movably mounted in said housing so as to be movable between a blocking position whereat said blocking piece engages said output drive member for blocking the latter against rotation and a clear position whereat said blocking piece is disengaged from said member so as to permit the latter to rotate freely;

releasable latching means disposed on said housing for latching and holding said blocking pin in said blocking position, said latching means including:

an actuating member movably mounted in said housing between an unlatched position and a latched position for actuating said blocking piece between said clear position and said blocking position;

resilient biasing means for resiliently biasing said actuating member into said unlatched position; and, guide means for guiding said actuating member in said housing between said unlatched position and said latched position; and, engagement means formed in said housing for engaging and holding said actuating member in said latched position against the force of said resilient biasing means.

14. The rotation-preventing locking device of claim 13, wherein said guide means is a track formed on the inner wall of said housing for guiding said actuating member between said positions.

15. The rotation-preventing locking device of claim 14, said actuating member and said housing defining respective and mutually coincidental longitudinal axes; said actuating member being movably mounted in said housing in the direction of said axes; and said engagement means being a catch formed in said inner wall of said housing and said actuating member being rotatable about the longitudinal axis thereof to engage said catch for holding said actuating member in said latched position.

* * * * *

UNITED STATES PATENT AND TRADEMARK OFFICE
CERTIFICATE OF CORRECTION

PATENT NO. : 4,690,252
DATED : September 1, 1987
INVENTOR(S) : Joachim Kottke et al It is certified that error appears in the above-identified patent and that said Letters Patent is hereby corrected as shown below:

In column 4, line 23: delete "net 10" and substitute -- nut 10 -- therefor.

In column 6, line 62: delete "suitably" and substitute -- suitable -- therefor.

In column 7, line 47: delete "unitl" and substitute -- until -- therefor.

In column 8, line 56: delete "to", first occurrence and substitute -- as a -- therefor.

In column 14, line 27: delete "pin" and substitute -- piece -- therefor.

Signed and Sealed this

Fifth Day of April, 1988

Attest:

DONALD J. QUIGG

Attesting Officer

Commissioner of Patents and Trademarks